United States Patent
Alexandre et al.

(10) Patent No.: US 6,229,925 B1
(45) Date of Patent: *May 8, 2001

(54) PRE-PROCESSING DEVICE FOR MPEG 2 CODING

(75) Inventors: Patrice Alexandre, Cesson-Sévigné; Jean-Christophe Morizur, Serills; Claude Perron, Betton, all of (FR)

(73) Assignee: Thomas Broadcast Systems, Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,447

(22) Filed: May 19, 1998

(Under 37 CFR 1.47)

(30) Foreign Application Priority Data

May 27, 1997 (FR) .................................................... 9706461

(51) Int. Cl.[7] .................................................... G06K 9/36
(52) U.S. Cl. .................................................... 382/239
(58) Field of Search .................................... 382/232, 233, 382/236, 238, 239, 240, 248, 250; 358/432, 433; 348/384, 394, 395, 400–404, 407–416, 420, 421, 425, 430, 431, 699, 452; 386/109, 111

(56) References Cited

U.S. PATENT DOCUMENTS

| | | | |
|---|---|---|---|
| 5,134,480 | * 7/1992 | Wang et al. | 348/452 |
| 5,621,468 | 4/1997 | Kim | 348/416 |
| 5,729,303 | * 3/1998 | Oku et al. | 348/423 |
| 5,734,755 | * 3/1998 | Ramchandran et al. | 348/403 |

(List continued on next page.)

FOREIGN PATENT DOCUMENTS

| | | |
|---|---|---|
| 0643537 | 3/1995 | (EP) . |
| 0705041 | 4/1996 | (EP) . |
| 0708564 | 4/1996 | (EP) . |

(List continued on next page.)

OTHER PUBLICATIONS

Lee J., et al., "Temporal Adaptive Motion Interpolation Exploiting Temporal Masking In Visual Perception", IEEE Transactions on Image Processing, vol. 3, No. 5, Sep. 1, 1994, pp. 513–526.
Foreign Search Report.

*Primary Examiner*—Jose L. Couso
(74) *Attorney, Agent, or Firm*—Joseph S. Tripoli; Eric P. Herrmann; Ronald H. Kurdyla

(57) ABSTRACT

The invention relates to a device for pre-processing video images intended to be coded in the MPEG 2 format. The MPEG 2 standard provides that, mode which exploits the spatial redundancy of the images. The images thus coded then define a succession of groups of images, a group of images being referred to as a GOP.

The pre-processing device according to the invention comprises an image memory and an analysis circuit.

The image memory makes it possible to store the various images contained in the forecast GOP of rank ok and ax of the first few images contained in the GOP of rank ok+l, ax being an integer greater than or equal to 1.

The analysis circuit is linked to the image memory and makes it possible to perform measurements on the images contained therein. The knowledge about the images of the GOP of rank and about the first images of the forecast GOP of rank k+1 which is ascertained following the above mentioned measurements is then used for coding the GOP of rank k.

The invention applies to systems for coding images according to the MPEG 2 standard.

8 Claims, 5 Drawing Sheets

U.S. PATENT DOCUMENTS

| | | | |
|---|---|---|---|
| 5,764,294 | * | 6/1998 | Fukuda et al. ........................ 348/394 |
| 5,867,221 | * | 2/1999 | Pullen et al. ......................... 348/417 |
| 5,923,376 | * | 7/1999 | Pullen et al. ......................... 348/417 |
| 6,014,496 | * | 1/2000 | Matsumoto et al. .................. 386/109 |

FOREIGN PATENT DOCUMENTS

| | | |
|---|---|---|
| 0758186 | 2/1997 | (EP) . |
| 0762778 | 3/1997 | (EP) . |
| 0 784 409 | 7/1997 | (EP) . |
| 0 778 707 | 11/1997 | (EP) . |
| WO 29559 | 11/1995 | (WO) . |
| WO 19081 | 6/1996 | (WO) . |
| WO 9739577 | 10/1997 | (WO) . |
| WO 97/46019 | 12/1997 | (WO) . |

\* cited by examiner

PRE-PROCESSING DEVICE FOR MPEG 2 CODING

BACKGROUND OF THE INVENTION

The invention relates to a device for pre-processing video images intended to be coded according to the MPEG 2 video standard.

A system for coding according to the MPEG 2 video standard uses the properties of the signal in order to reduce its bit rate.

The coding algorithm employed describes the images in blocks, exploiting the spatial redundancy and the temporal redundancy of the images to be coded.

The spatial redundancy is evaluates, chiefly, through the succession of three operation: an operation commonly termed discrete cosine transform and denoted DCT, an operation quantizing the coefficients from the DCT and a variable-length coding operation for describing the quantized coefficients from the DCT.

The temporal redundancy is analysed by a motion compensation operation which consists in searching, using a translation operation for each block of the current image, for the most similar block situated in a reference image, for the most similar block situated in a reference image. Analysis of the temporary redundancy involves determining a field of translation vectors, commonly termed motion vectors, as well as a prediction error, namely the difference between the signal of the current image and the signal of the image predicted by motion compensation. The prediction error is then analysed according to the principle of spatial redundancy.

MPEG 2 coding is a coding of predictive type. It follows that the decoding procedure associated with it must be regularly re initialized so as to protect the signal form any transmission error or any break in signal due to the toggling of the decoder from one programme to another.

For this purpose, the MPEG 2 standard provides that, periodically, the images must be coded in spatial mode, that is to say according to a mode which exploits spatial redundancy only. The images coded in spatial mode are commonly termed INTRA images or I images.

The images coded by exploiting temporal redundancy are of two types: there are, on the one hand, these images constructed by reference to a temporally earlier image and, on the other hand, these images constructed by reference to a temporally earlier image and to a temporally later image.

The coded images constructed by reference to a temporally earlier image are commonly referred to as predicted images or P images and the coded images constructed by reference to a temporally earlier image and to a temporally later image are commonly referred to as bi-directional images or B images.

An I image is decoded without making reference to images other than itself, A P image is decoded by making reference to the P or I image which precedes it. A B image is decoded by invoking the I or P image which precedes it and the I or P image which follows it.

The periodicity of the I images defines a group of images commonly denoted GOP (the acronym GOP standing for "Group of Pictures").

As is known to those skilled in the art, within a given GOP, the amount of date contained in an I image is generally greater than the amount of date contained in a P image and the amount of data contained in a P image is generally greater than the amount of date contained in a B image.

In order to manage this disparity between the amounts of data depending on the type of image, an MPEG 2 coder comprises a device for servocontrolling the data bit rate.

Such a servocontrol device makes it possible to control the flow of the coded data. It comprises a buffer memory, for storing the coded data, and models the state of the buffer memory dual to a so-called reference decoder. The servocontrol device smoothes the bit rate of the data exiting the buffer memory in such a way that the sum of the data contained in the coder and in the reference decoder is constant.

Thus, depending on the type of image (I, P or B) this involves managing the fact that the I images produce a bit rate greater than the mean bit rate), that the P images produce a bit rate near the mean bit rate and that the B images produce a bit rate less than the mean bit rate (typically equal to 0.1 to 0.5 times the mean bit rate).

According to the prior art, the coding of an I image is performed in two passes. To determine the quantization step required for coding an I image, a proportionality rule is applied as follows:

$$Qsp \times Nbsp = Qpp \times Nbpp,$$

Qsp being the value of the quantization step applied for coding the I image during the second pass, Nbsp being the number of bits provided for coding the I image during the second pass, Qpp being the value of the quantization step applied for coding the I image during the first pass, and Nbpp being the number of bits produced by coding the I image during the first pass.

As regards the coding of the P or B images, the flow control operates according to the assumption of signal stationary. According to this assumption, each P or B image produces, for the same value of quantization step, a number of bits identical to the number of bits produced by the previous image of the same kind (P or B respectively).

In the case where the frame frequency of the signal is 60 Hz the video signal to be coded exhibits redundant frames. The MPEG 2 standard then provides for the possibility of not coding these frames and of transmitting a replication order therefor to the coder. To detect the redundant frames, measurements are performed of the difference in luminance between pixels of successive frames. Such pixel-to-pixel difference measurements do not offer relevant information as regards the kind and the degree of motion contained in the images. It follows that the distribution of the types of images (P or B) in a GOP is generally fixed by the frequency of appearance of images of type P alone. At the very most, the pixel-to-pixel difference measurements allow the detection of a change of scene possibly manifested, in certain cases, through the adjusting of the size of the GOP.

The abovedescribed type of coding of I, P or B images has drawbacks.

The I image of a GOP is the one with the highest cost in terms of amount of information. The buffer memory mentioned earlier must absorb the very considerable bit rate of this image. According to the prior art, in order to avoid the occurrence of a critical situation upon an increase in the entropy of the signal in the very first few images following the coding of an I image, the cost of the I image is limited so as to preclude the buffer memory of the coder from saturating and the buffer memory of the reference decoder drying up. It is thus usual to prevent the buffer memory of the coder from filling to more than 60 to 70%. This results in a limitation on the quality of the I images.

Since the I image of a GOP serves as reference in the coding of all the other images of the GOP, the limitation on the quality of an I image entails a limitation on the quality of all the other images on the GOP.

More generally, when the signal to be coded exhibits substantial modifications, for example upon a change of picture shot, or more generally, upon a sudden variation in the entropy of the signal (the entropy of the signal denotes the amount of intrinsic information which the signal contains), a temporal instability appears in the reproduction of the images. This temporal instability is manifested as a drop in the quality of the images.

Moreover, as is known to those skilled in the art, an image which corresponds to a considerable variation in the entropy of the signal induces a high cost of coding corresponding to that of an I or P image. Irrespective of the above mentioned drop in the quality of the images, the coding system is then compelled to reduce the bit rate of the images following the image corresponding to the considerable increase in entropy.

Furthermore, when the coded video signals are intended to be multiplexed with other signals of the same type, the overall bit rate of the multiplex must be shared between the various signals. This configuration arises, for example, when broadcasting video programmes by satellite. In this case, the bit rate of the multiplex may reach 40 Mb/s thus permitting the transport of several programmes simultaneously (10 programmes at 4 Mb/s each for example).

A video programme emanating from a MPEG 2 type coding at fixed bit rate exhibits, after decoding, a variation in the quality of the image restored. This stems from the variability of the entropy of the video signal over time, this variability being manifested as a fluctuation in the quantization level of the DCT coefficients.

A suitable allocation of the bit rates associated with the video programmes then allows an overall enhancement in the quality of all the video programmes and/or an increase in the number of programmes broadcast. According to the prior art, the result of coding the GOP of order k is then used as prediction for the expected difficulty in coding the GOP of order k 1. However, this solution has two drawbacks:

1. Should the contents of the video signal vary widely, the result of coding the GOP of index k may differ appreciably from the result of coding the GOP of index k+1.

2. The GOP of index k+1 may, for optimization reasons, be made to undergo considerable structural variations (the size of the GOP and the distribution of the B and P images within the GOP) with respect to the GOP of index k.

SUMMARY OF THE INVENTION

Advantageously, the invention makes it possible to overcome these drawbacks by providing, for each GOP to be coded, a prediction of the cost of coding in accord with the structure adopted for this GOP. This predication is then exploited directly by the bit rate allocator.

The invention relates to a device for pre-processing images intended to be structured in the form of successive groups (GOOP) of coded images, the firs image of each group consisting of an image coded in spatial mode. The pre-processing device comprises an image memory making it possible to store all the images intended to constitute a group of images (GOP) and an analysis circuit making it possible to read the image memory and to calculate a command comprising, for each image read, a redundant frame cue, a cue giving the type (I,P,B) according to which the image is to be coded and a cue measuring the complexity of the image and, for all the images constituting a group of images (GOP), a cue measuring the aggregate value of the complexities of the various images of the group.

The invention also relates to a device for coding images according to the MPEG 2 video standard comprising processing circuits for coidng the images. The image coding system comprises a device for pre-processing the images according to the invention such as the device mentioned above.

The invention also relates to a video date dynamic bit rate allocation system comprising n devices for coding according to the MPEG 2 standard, a bit rate allocation facility and a multiplexer allowing the video date emanating from the various coidng devices to share the same broadcasting channel. The dynamic bit rate allocation system comprises at least one coding device according to the invention such as that mentioned above, the cues used to generate processing circuit commands emanating from the pre-processing device according to the invention being applied to the bit rate allocation facility.

The pre-processing device according to the invention advantageously makes it possible to define the boundaries of a GOP in an adaptive manner, to distribute in the best possible manner the type (I, P or B) of the various images contained in a GOP and to obtain a prediction of the costs of coding (spatial and temporal) for each image of the GOP.

As mentioned previously, the images emanating from a source working at 60 Hz contain redundant frames. Advantageously, the invention makes it possible to ascertain the number of redundant frames contained in a GOP and, consequently, to avoid the coding of these frames. This results, overall, in a better strategy for allocating the bit rate of the data representing the images to be coded.

BRIEF DESCRIPTION OF THE DRAWINGS

Other characteristics and advantages of the invention will emerge on reading a preferred embodiment given with reference to the appended figure in which.

DESCRIPTION OF THE PREFERRED EMBODIMENTS

Figure 1:
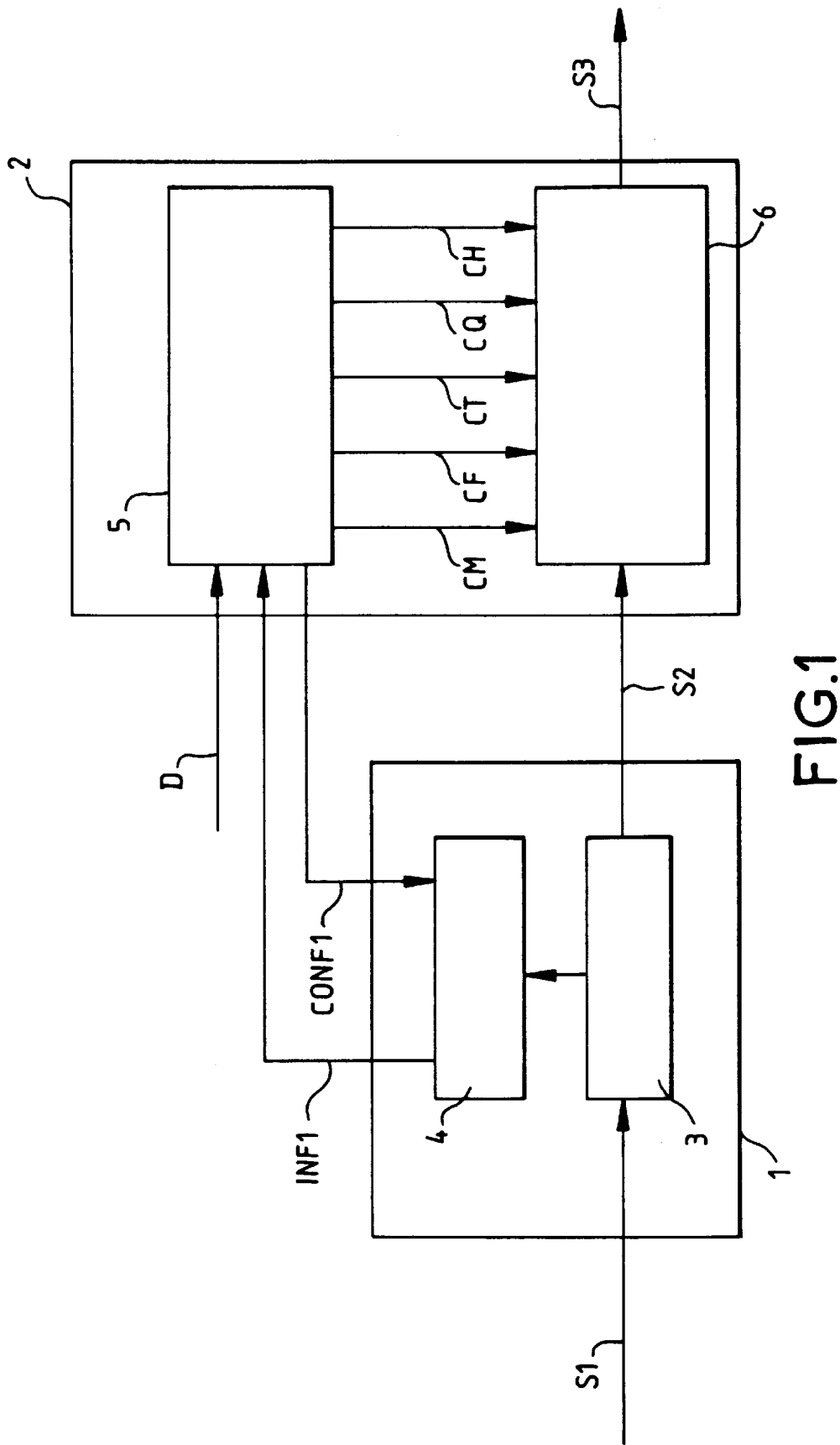
FIG. 1 is a schematic representation of a coding system using a preprocessing device according to the invention.

FIG. 1 is schematic representation of a coding system using a pre-processing device according to the invention.

The coding system comprises a pre-processing device 1 according to the invention and an MPEG 2 coder labelled 2. The pre-processing device 1 comprises an image memory 3 and an image analysis device 4. The coder 2 comprises a block 6 of processing circuits and a microprocessor 5.

In FIG. 1 the pre-processing device 1 is a block of circuits exterior to the MPEG 2 coder. However, the invention relates also to the case where the device 1 is built into the MPEG 2 coder. The device 1 and the block 6 then constitute one and the same block of circuits.

The input signal S1 of the pre-processing device 1 consists of digital images formatted according to the CCIR 601 standard. The signal S1 is applied to the input of the image memory 3 which feeds the image analysis device 4. The image analysis device 4 makes it possible to perform measurements of spatial and temporal complexities of the various images constituting the signal S1 as well as measurements of detection of change of scene and redundant frame.

According to the invention, the measurements performed by the device 4 make it possible to construct the cues INF1 applied to the microprocessor 5. The delay required in calculating the cues INF1 is applied by the image memory 3 to the images which it stores. Once the analysis has been performed, the images contained in the memory 3 are transmitted to the block 6 of processing circuits of the coder 2.

The spatial complexity of an image is evaluated by measuring the amount of information which it contains. The temporal complexity of an image is effected by measuring the amount of information contained in the image formed by the pixel-to-pixel difference between this image and a temporally earlier reference image. Preferably, the temporally earlier reference image is a motion-compensated image which reproduces the current image and is termed the predicted image.

The spatial and temporal complexity measurements according to the invention advantageously make it possible accurately to determine the level of difficulty of coding the sequence of images processed.

The detections of change of scene and of redundant frame can be carried out by observing the differences in luminance between pixels with the same co-ordinates contained in two successive frames of like parity. In the event of a strong similarity between two successive frames of like parity, the second may be declared redundant. Conversely, a large increase in the dissimilarity between two successive frames of like parity is indicative fo a change of scene.

The various measurements mentioned above make it possible to construct the cues INFO emanating from the analysis device 4 and transmitted to the microprocessor 5. Among these cues there appear, in a non-limiting manner, the type (ZIP or B) according to which an image must be coded, the presence of redundant frame in an image, the spatial complexity in the case of an image requiring to be coded as an image of type I, the temporal complexity in the case of an image requiring to be coded as an image of type P or B and the aggregate complexity over a GOP. The phrase aggregate complexity over a GOP should be understood to mean a measurement making it possible to derive a complexity cue relating to all the images of one and the same GOP. By way of non-limiting example, the aggregate complexity of a GOP can be equal to the weighted sum $X_G$ such that:

$$X_G = K_I \times X_I + \Sigma_{BGOP} K_B \times X_B + \Sigma_{PGOP} K_P \times X_P,$$

where:

$X_I$, $X_P$, $X_B$ represent the complexities relating to the images of respective types I, P and B contained in the GOP;

$K_I$, $K_P$, $K_B$ represent static coefficients associated with the images of respective types I, P and B;

$\Sigma_{BGOP}$ is the sum over all the images of type B contained in the GOP;

$\Sigma_{PGOP}$ is the sum over all the images of type P contained in the GOP.

The contents of the cues INFO are conditioned by a configuration command CONF1 emanating from the microprocessor 5 and applied to the analysis device 4. The command CONF1 represents the configuration state of certain parameters of the MPEG 2 coder.

The microprocessor 5 employs the pre-processing and regulating algorithms which allow the control of the various processing circuits contained in the block 6.

As is known to those skilled in the art, the processing circuits contained in the block 6 consist, among other things, of a device for horizontal and vertical filtering, a device for rearranging the images, a motion estimator, a coding decision block, a circuit for quantizing the coefficients emanating from the discrete cosine transform, a variable-length coder and the buffer memory of the previously mentioned servocontrol device.

According to the preferred embodiment of the invention, the cues INFO used as parameters of the regulating algorithm contribute to generating various commands CM, DF, CT, CQ and CH emanating from the microprocessor 5 and applied to the circuit block 6.

The command CM is a command applied to the block for coding by quantizing the DCT coefficients. This command makes it possible to define the values of the two sets of 64 coefficients which constitute the intra and inter quantization matrices according to the MPEG 2 video standard. The command CM preferably emanates form the cue relating to the aggregate complexity over the GOP to be coded in correlation with the bit rate set-point D.

The command CF is a command applied to the horizontal and vertical filtering device. This command makes it possible to define the resolution of an image. It is then possible to choose, for example, an image resolution containing 720, 544, 480 or 352 pixels per line. The command CF is driven jointly with the command CM with, preferably, the same cues.

The command CT is a command applied to the device for rearranging the images. This command makes it possible to define the structure of a GOP through the image types (I, P or B) contained in the cues INFO It is also applied to the coding decision block which must know the image type (I, P or B) which the coding block 6 has to code.

The command CQ is a command applied to the circuit for quantizing the coefficients emanating form the discrete cosine transform. This command makes it possible to modify the step of the quantization carried out by the quantization circuit so as to comply with the set-point bit rate D applied to the microprocessor 5. The complexity measurements as well as the redundant frame cue which are contained in INFO contribute to constructing the cue contained in the command CQ.

The command CH is a command applied to the buffer memory of the servocontrol device. It makes it possible to define a header with each GOP and with each image within the GOP.

The various commands CM, CF, CT and CQ make it possible advantageously to adapt the coding strategy employed by the processing circuits of the block 6.

By way of example, for a size of GOP defined, a priori, over 12 images, the analysis device 4 works on 18 images before any coding operation begins These 18 images then represent the maximum size allowable for adjusting the GOP of rank k. As is known to those skilled in the art, the size of a GOP directly conditions the time lag required by a decoder in order to commence the decoding of the MPEG 2 stream which it receives. Thus, the maximum size of a GOP is limited by the lag which a user allows in order for the decoder to display the first image. A nominal size of GOP of 12 images is commonly used, for example, for the satellite distribution of video programmes in the PAL/625 lines/50 Hz format. In this case, an image lasts 40 ms and the decoder lock-on lag is as much as 12 times 40 ms, i.e. 480 ms.

According to the invention in the case where a strong temporal discontinuity occurs in any one of images 1 to 6 of the forecast GOP of rank k+1, then the pre-processing device lengthens the GOP of rank k so as to position the first image of the GOP of rank k+1 on the first image which temporally follows this discontinuity, Conversely, in the case where a strong temporal discontinuity occurs on any one of images 7 to 12 of the GOP of rank k, then the pre-processing device shortens the GOP of rank k, so as to position the first image of the GOP of rank k+1 on the first image which temporally follows this discontinuity.

In the case where no temporal discontinuity of the images occurs under the conditions mentioned above, the GOP of rank k is then constructed without modifying its boundaries, that is to say, in the example mentioned above, on the basis of a structure with 12 images.

As is known to those skilled in the art, according to the MPEG 2 video standard, the bit rate of the coded data which represent the images must comply with the set-point D. The regulating algorithm must then adjust to the value D the volume of date coded from one GOP to the next by acting on the command CQ.

According to the invention, the cues INFO make it possible to optimize the distribution of the coded data within one and the same GOP. This results in greater effectiveness in the choice of quantization values used for coding the collection of images constituting a GOP and, consequently, an enhancement to the quality of the images perceived.

Figure 2:
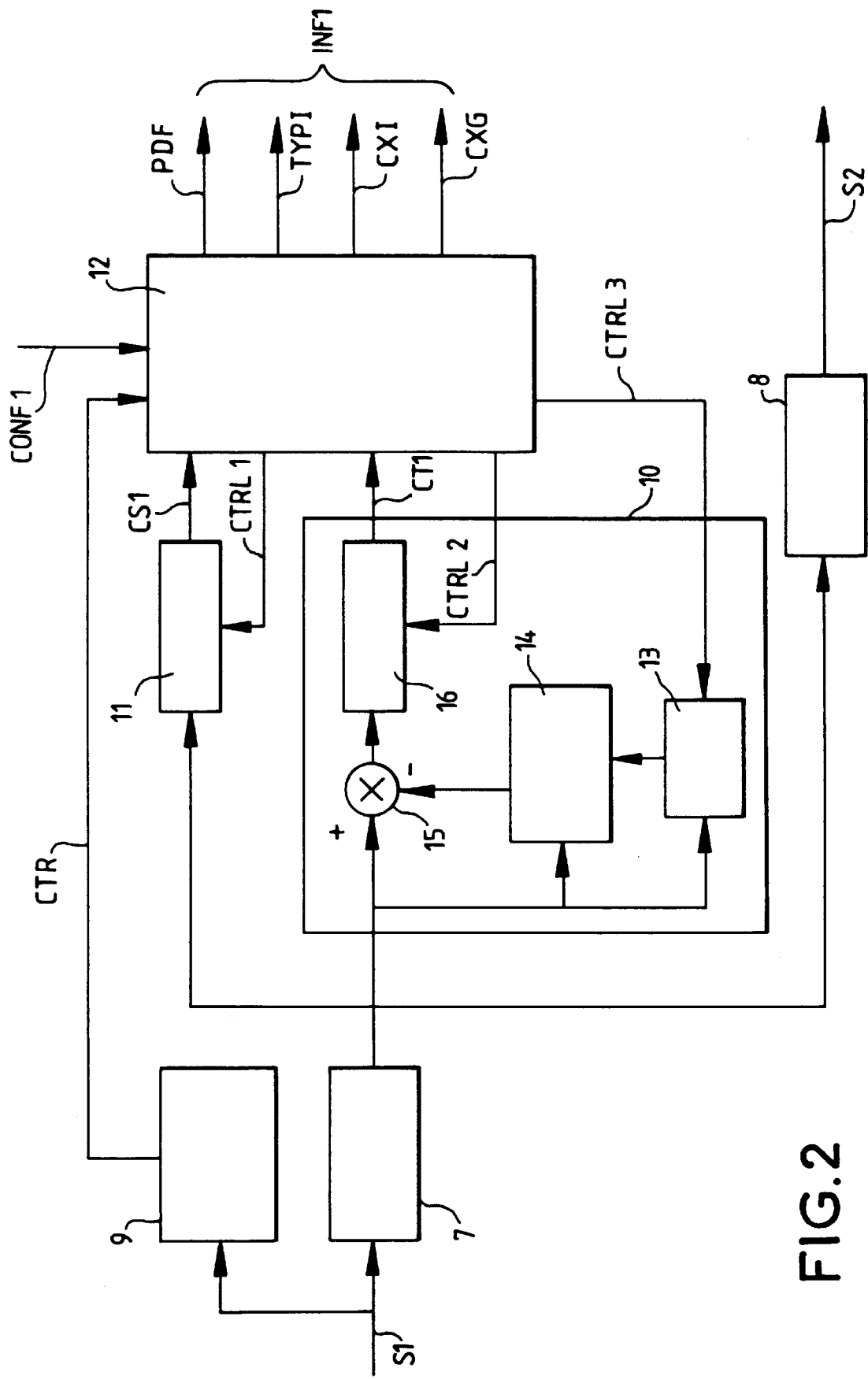
FIG. 2 is a detailed representation of the pre-processing device according to a first embodiment of the invention.

FIG. 2 is a detailed schematic representation of a first embodiment of the pre-processing device according to the invention.

The device of FIG. 2 comprises two image memories 7 and ax of FIFO type (the abbreviation FIFO standing for "First In First Out"), a redundant frame and scene change detection module 9, a module 10 for analyzing temporal complexity, a device 11 for analyzing spatial complexity and a GOP structure allocation module 12.

The image memories 7 and ax are arranged in series and constitute the image memory labelled 3 in FIG. 1.

The signal S1 enters on the image memory 7 and, in parallel, on the redundant frame and scene change detection module 9. The CTR signal emanating from the module 9 is transmitted to he module 12. The capacity of the image memory 7 corresponds to the difference between Nmax and Nnom, where Nmax represent the maximum size, as defined above, allowable for a GOP and Nnom the nominal size of a GOP, that is to say the size defined, a priori, as that required to be assigned to a GOP.

Preferably, the image memory ax delays the images exiting from the image memory 7 by a depth equal to the maximum allowable size Nmax in such a way that the sending of the cues INFO relating to a collection of images which is to constitute a GOP starts, at the very latest, at the instant at which the first image of the collection of images exits from the memory ax The images emanating from the image memory 7 are received by the spatial complexity analysis device 11 on its input. The device 11 comprises means for implementing the following successive operations: chopping of an image into matrix blocks of ax×ax pixels, DCT transformation on each block, quantization of the coefficients emanating from the DCT, variable-length coding of the quantized coefficients. Under the action of the command CTRL1 emanating form the module 12, the device 11 generates, image by image, a cue CS1 representing the cost in terms of the number of bits of the image analysed.

The temporal complexity analysis module 10 comprises an image memory 13, a motion compensation device 14, a differencer 15 and a temporal complexity analysis device 16. According to the invention, a difference of images, emanating form the differencer 15 is received by the device 16 on its input. This difference of images consists, pixel-to-pixel, of the discrepancy between the current image (applied to the positive input (+) of the differencer 15) and a reference image (applied to the negative input (−) of the differencer 15) emanating form the motion compensation device 14.

The reference image emanating from the motion compensation device 14 is a predicted image constructed from the current image and from an image stored in the image memory 13. The image stored in the image memory 13 is the last image calculated by the module 12 as having to be coded as an image of type P or of type I. It is loaded into the memory 13 under the action of a command CTRL3 emanating from the module 12. The motion compensation device 14 can, by choice, deliver a field of vectors at pixel level or else search for the motion vectors over blocks of ax pixels×ax pixels.

The device 16 comprises means for implementing the following successive operations: chopping of the image difference into matrix blocks of ax×ax pixels, DCT transformation on each block quantization of the coefficients emanating from the DCT, variable-length coding of the quantized coefficients. Under the action of the command CTRL2 emanating form the module 12 the device 16 generates for each analysed difference of images, a cue CT1 representing the cost in terms of the number of bits of the analysed image difference.

At the output of the GOP structure allocation module 12, three cues (PDF, TYPI, CXI) are available at the image frequency: one cue PDF indicates the presence of a redundant frame in the current image, one cue TYPI gives the type (I, P or B) according to which the current image is to be coded and one cue CXI measures the complexity of the current image (spatial complexity for an image of type I or temporal complexity for an image of type P or B).

The spatial and temporal complexity measurements are calculated by the module 12. The spatial complexity measurement is equal to the product of the cost CS1 times the step of the quantization operation implemented in the device 11. The temporal complexity measurement is equal to the product of the cost CT1 times the step of the quantization operation implemented in the device 16.

According to the preferred embodiment of the invention, the three cues PDF, TYPI and CXI are placed in phase, by any know means, with the signal S2 emanating form the memory ax The GOP structure allocation module 12 also generates a fourth cue CXG, the function of which is to measure the aggregate value of the complexities of the various images constituting a GOP. According to the preferred embodiment of the invention, the cue CXG is in phase with the cue CXI which corresponds to the first image of a GOP.

The collection of cues PDF, TYPI, CXI and CXG constitute the command signal INFO According to the embodiment of the invention represented in FIG. 2, the reference image is a predicted image emanating form the motion estimator 14. However, the invention also relates to the case where the device 10 comprises no motion estimator and where the reference image is directly the image emanating from the memory 13.

Figure 3:
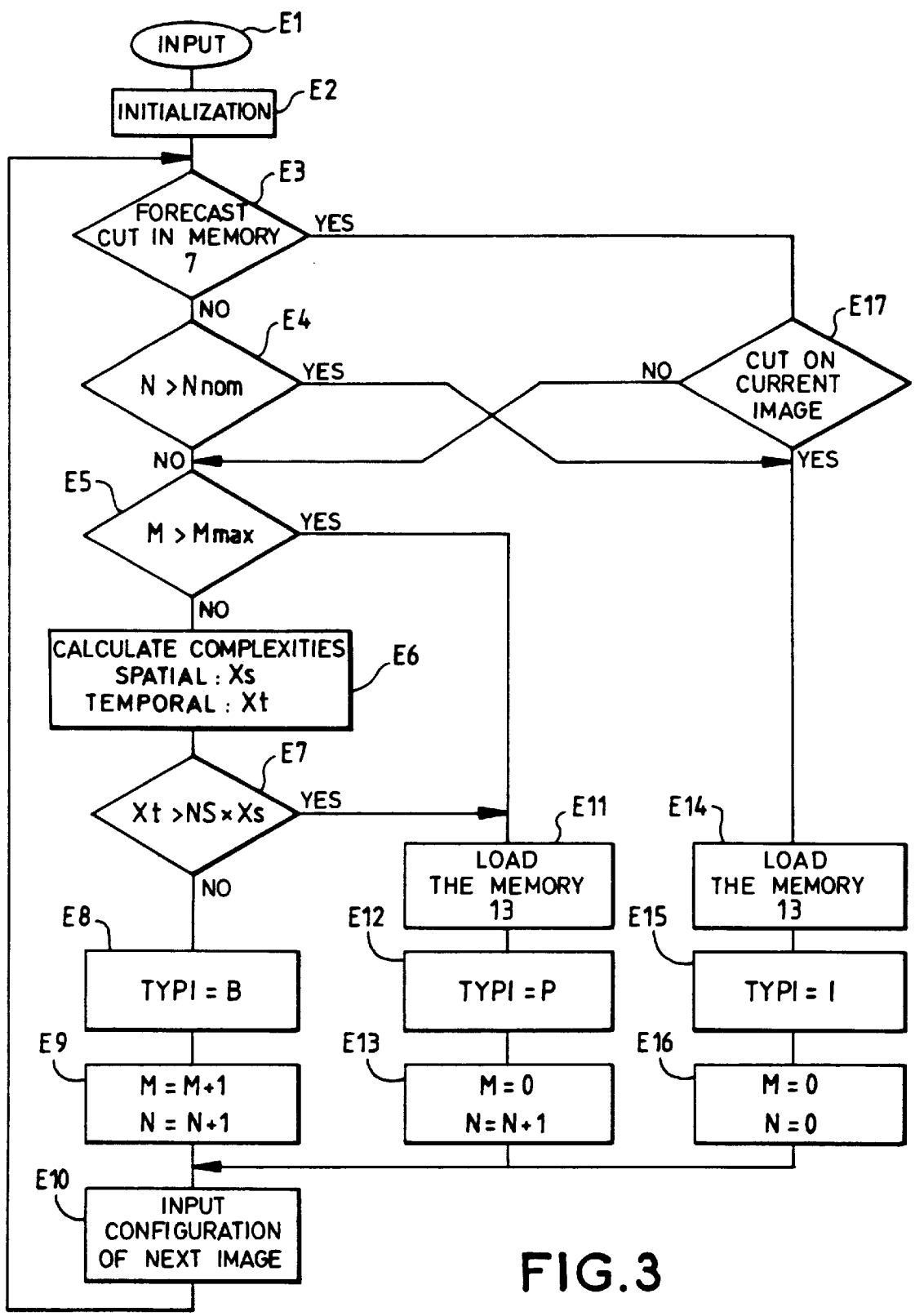
FIG. 3 is a representation, in the form of a state diagram, of an elementary algorithm employed in the pre-processing device according to the invention.

FIG. 3 is a detailed schematic representation in the form of a state diagram of an algorithm implemented in the pre-processing device according to the invention.

The algorithm of FIG. 3 is the algorithm used by the GOP structure allocation facility 12.

This diagram is traversed temporally form top to bottom in FIG. 3. It is implemented with the arrival of each new image at the input of the facility 12 (state E1 at the start and E10 subsequently). The initialization phase (state E2) makes it possible to fix the parameters relating to the operation of the module 12, among which may be identified, for example: Nnom, the nominal size of a GOP with no change of scene, Mmax, the maximum number of allowable consecutive images of type B, NS the threshold of comparison between the temporal and spatial complexities. After initialization, these parameters can also be updated with each image (state E10).

The parameters N, M and TYPI mentioned in the diagram of FIG. 3 relate to the images processed by the complexity analysis device 11 and 16 and respectively represent the total number of images already identified in the GOP currently being structured, the number of consecutive images B already identified in the GOP currently being structured and the type of the image just analysed. On initialization N, M and TYPI are set to the following values: N=0, M=0, TYPI=undefined.

The spatial (Xs) and temporal (Xt) complexity measurements are obtained form the costs CS1 and CT1 emanating respectively form the complexity analysis devices 11 and 16. According to the invention, it is supposed that the temporal complexity cannot be greater than the spatial complexity so that the ratio of the temporal complexity to the spatial complexity takes a value lying between 0 and 1.

Three possibilities offer themselves for calculating the value of TYPI. The first arises when the parameter N exceeds the value Nnom and when no change of scene or cut has been detected in the images contained in the memory 7 (states E3 and E4 hold true) or when a change of scene is detected in the current image exiting from the memory 7 (states E3+E17 hold true). In this first case, TYPI takes the type I (state E15) and the aggregate complexity CXG is stored before being reset to zero so as to be presented in the cues INF1 in phase with the first image of the GOP which has just terminated. The parameters M and N are then reinitialized (state E16) and the memory 13 containing the reference image utilized by the motion estimator 14 is loaded with the current image (stat E14).

If the conditions relating to the state E3 and the state E4 are not satisfied, two new tests are number of consecutive images of type B exceeds the maximum allowable value (state E5), the second consists in comparing values of the spatial (Xs) and temporal (Xt) complexities calculated previously (state E6) on the basis of the costs CS1 and CT1 emanating form the complexity analysis devices 11 and 16. The test (state E7) then amounts to checking whether the ratio between the temporal complexity Xt and the spatial complexity Xs exceeds the threshold NS. If one or other of the conditions relating to the states E5 and E7 is satisfied, TYPI takes the value P (state E12) and the memory 13 containing the reference image utilized by the motion estimator 14 is loaded with the current image (state E11). In accord with this choice, the parameter M is reset to zero and the parameter N is incremented by one image (stat E13).

If the test relating to the states E5 and E7 do not hold true, the third particular case occurs in which TYPI takes the value B (state E8). In this latter case, the parameters M and N are incremented by one image (state E9).

For each image processed, with the transition state E10, the image complexity cue CXI takes a value proportional to Xs if the image is decreed of type I or a value proportional to Xt if the image is decreed of type P or B. The proportionality rules in accordance with the type of the image are defined in the configuration parameters. CONF1. The aggregate complexity value CXG is then updated by adding the current value CXI.

Figure 4:
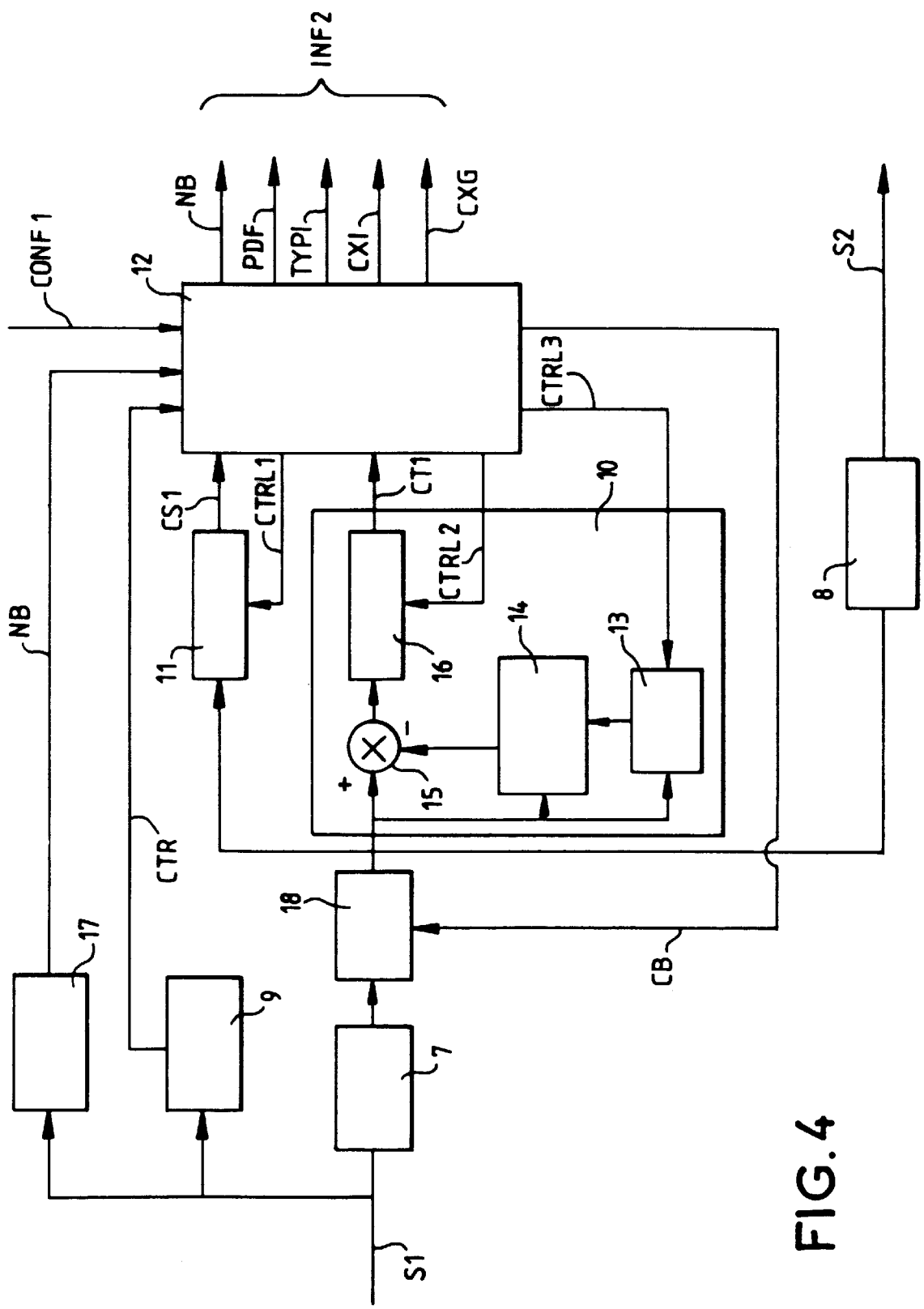
FIG. 4 is a detailed schematic representation of the pre-processing device according to a second embodiment of the invention.

FIG. 4 is a detailed schematic representation of the pre-processing device according to a second embodiment of the invention.

The device of FIG. 4 comprises blocks 7, ax, 9, 10, 11 and 12 such as those described in FIG. 2. In addition to the blocks 7, ax, 9, 10, 11 and 12, the device according to the second embodiment of the invention comprises a device 17 for measuring noise level and a noise reducer 18. The device 17, placed in parallel with the module 9, receives the signal S1 on its input. The noise reducer 18 has its input linked to the output of the memory 7 and its output linked to the input of the complexity analysis modules 10 and 11 as well as to the input of the image memory ax The device 17 makes it possible to measure, in a manner known per se, the floor video noise level (commonly referred to simply as the "noise floor") of the images constituting the signal S1. The noise level measurement NB emanating from the device 17 is transmitted, in the same way as the redundant frame and scene change cues CTR, to the GOP structure allocation module 12. In return, the module CB. This command can, among other things, control the activation or otherwise of the noise filters.

The noise reducer uses, in a manner known per se, spatio-temporal filtering techniques of the medial and recursive types. It can also comprise a motion compensation device such as the device 14 so as to enhance the effectiveness of the filtering performed on the data which represent moving objects.

The noise level NB emanating from the device 17 is added by the GOP structure allocation module 12 to the cues PDF, TYPI, CXI and CXG so as to form a group of cues INF2.

The image memory 7 is reduced by the delay introduced by the noise reducer 18 in such a way as to keep the cues INF2 in phase with the images which constitute the signal S2. According to the preferred embodiment, the noise reducer introduces a further lag of three frames.

Figure 5:
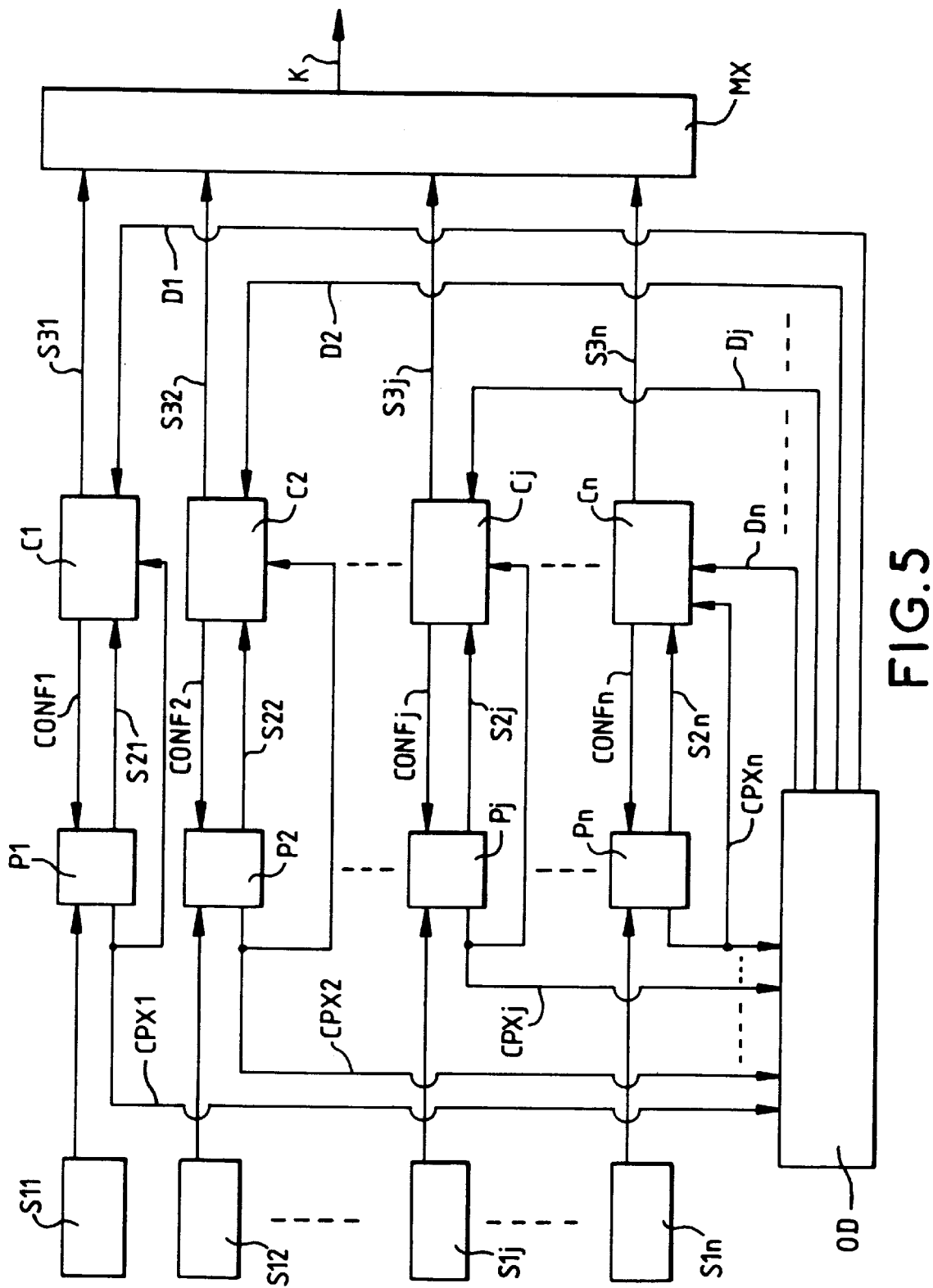
FIG. 5 is a schematic representation of a dynamic bit rate allocation system for MPEG 2 coding using a collection of pre-processing devices according to the invention.

FIG. 5 represents the schematic of a dynamic bit rate allocation system for MPEG 2 coding using a collection of pre-processing devices according to the invention.

This system comprises n image sources S11, S12, . . . , S1j, . . . S1n, n pre-processing devices according to the invention P1, P2, . . . , Pj, . . . Pn, n MPEG 2 coders C1, C2, . . . , Cj, . . . , Cn, a bit rate allocation facility OD and a multiplexer MX allowing the various sources to share the same broadcasting channel K. As represented in FIG. 1, the video signal S2j (j=1, 2, . . . , n) which emanates form the pre-processing device Pj is transmitted to the coder Cj and the command CONFj emanating form the coder Cj is applied to the pre-processing device Pj.

According to the prior art (i.e. when the system does not contain any pre-processing device according to the invention), the bit rate allocation facility OD allocates each of the coders a bit rate proportional to the complexity of the images to be coded, while guaranteeing, at each instant, that the sum of the bit rates does not exceed the bit rate permitted by the channel. As is known to those skilled in the art, the bit rate cue sent by the decision facility to a coder is the applied with a certain delay due to the duration of the exchanges necessary between the decision facility and the coder.

In particular, upon a change of shot, the bit rate requirement, may prove to be very considerable, whereas the coder receives the set-point corresponding to this requirement with several delay images. The predictive coding results in a degradation of the images which follow the image representing the change of shot.

The dynamic bit rate allocation system according to the invention does not have these drawbacks.

According to the invention, each MPEG 2 coder Cj (j=1, 2, . . . , n) is preceded by a pre-processing device Pj such as one of those described in FIG. 2 or 4. The cues enabling the bit rate allocation facility OD to generate the various bit rate set-points Dj are then either the cues INF1, in the case of a pre-processing device such as that described in FIG. 2, or the cue INF2 in the case of a pre-processing device such as that described in FIG. 4.

In FIG. 5, the cues INF1 or INF2 are denoted CPXj generically for the pre-processing device of order j.

Advantageously, under the action of cues CPZj, the bit rate allocation facility OD is then able to generate bit rate set-points Dj without the delay mentioned above, Moreover, the bit rates generated by the facility OD are in accord with the choices of GOP structures of the pre-processing device. This results in a better distribution of the bit rates over the whole of the transmission channel.

A particularly advantageous application of a bit rate allocation system according to the invention relates to the coding of several sources in the context of direct satellite broadcasting.

What is claimed is:

1. A preprocessor for a video signal coding system including a coder for compressing video signal and responsive to at least a quantizing control signal, and a coding type (I,P,B) control signal, said preprocessor comprising:

a memory of capacity sufficient to contain a group of frames (GOP) of said video signal and coupled to provide said video signal to said coder;

an analyzer, coupled to receive uncoded video signal from said memory, for analyzing said video signal date to determine spatial and temporal complexity values of a group of frames, and generating at least said quantizing control signal and said coding type signal; and circuitry coupling said quantizing control signal and said coding type signal to said coder.

2. The system set forth in claim 1 wherein said coder is further responsive to a header control signal for instituting generation of appropriate picture headers and said analyzer further generates said header control signal responsive to said spatial and temporal complexity, and said circuitry couples said header control signal to said coder.

3. The system set for the in claim 1 wherein said coder is further responsive to a quantizer modifying control signal, CQ and said analyzer further generates said quantizer modifying control signal, CO, and said circuitry couples said quantizer modifying control signal, CQ, to said coder.

4. The system set for the in claim 1 wherein said coder is further responsive to a resolution control signal, CF, and said analyzer further generates said resolution control signal, CF, and said circuitry couples said resolution control signal, CF, to said coder.

5. The system set forth in claim 1 wherein said coder is further responsive to a header control signal for instituting generation of appropriate picture headers, and is responsive to a quantizer modifying control signal, CQ, and is responsive to a quantizer modifying control signal, CQ and said analyzer further generates said header control signal responsive to said spatial and temporal complexity, and further generates said quantizer modifying control signal, CQ, and further generates said resolution control signal, CF, and said circuitry couples said header control signal, said quantizer modifying control signal, CQ, and said quantizer modifying control signal, CQ, to said coder.

6. The system set for the in claim 1 wherein said analyzer includes apparatus for DCT transforming said group of frames on a block basis and quantizing and variable length coding transformed said blocks to generate said spatial complexity value.

7. The system set for the in claim 1 wherein said analyzer includes apparatus for forming block differences of corresponding blocks in successive frames of said group of frames to generate said temporal complexity value.

8. The system set for the in claim 1 wherein said analyzer includes apparatus for DCT transforming said group of frames on a block basis and quantizing and variable length coding transformed said blocks to generate said spatial complexity value, and includes apparatus for DCT transforming said group of frames on a block basis and quantizing and variable length coding transformed said blocks to generate said spatial complexity value.

\* \* \* \* \*